United States Patent
Hatano

(10) Patent No.: US 7,781,942 B2
(45) Date of Patent: Aug. 24, 2010

(54) TIRE WITH ELECTRIC POWER GENERATION DEVICE

(75) Inventor: Yasuo Hatano, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 271 days.

(21) Appl. No.: 11/815,968

(22) PCT Filed: Feb. 8, 2006

(86) PCT No.: PCT/JP2006/302162

§ 371 (c)(1),
(2), (4) Date: Aug. 9, 2007

(87) PCT Pub. No.: WO2006/085550

PCT Pub. Date: Aug. 17, 2006

(65) Prior Publication Data

US 2009/0072661 A1    Mar. 19, 2009

(30) Foreign Application Priority Data

Feb. 10, 2005  (JP)  ................... 2005-034663

(51) Int. Cl.
*H01L 41/08* (2006.01)
(52) U.S. Cl. .................. 310/339; 310/800
(58) Field of Classification Search .......... 310/339, 310/800, 338, 328; 290/1 R
See application file for complete search history.

(56) References Cited

U.S. PATENT DOCUMENTS 6,992,423 B2 * 1/2006 Mancosu et al. ............ 310/339
7,415,874 B2 * 8/2008 Mancosu et al. ............ 310/339

FOREIGN PATENT DOCUMENTS

| JP | 60-039379 | 3/1985 |
|---|---|---|
| JP | 2001-180553 | 7/2001 |
| JP | 2003-153557 | 5/2003 |
| JP | 2004-224069 | 8/2004 |

OTHER PUBLICATIONS

International Search Report from PCT/JP2006/302162 dated May 2, 2006.

* cited by examiner

*Primary Examiner*—Walter Benson
*Assistant Examiner*—Karen B Addison
(74) *Attorney, Agent, or Firm*—Knobbe Martens Olson & Bear, LLP

(57) ABSTRACT

The invention provides a tire with an electric power generation device for supplying sufficient electric power which has a simple and small-sized construction. An electric power generation device for converting strain occurring in a tire into electric energy includes at least one electric power generation element and a device body. The electric power generation element has at least two stretchable electrodes and a dielectric elastomer, arranged between the electrodes, and producing a potential difference between the electrodes according to the strain applied from the tire. The device body has an electrical condenser for accumulating electric energy produced by the electric power generation element. The length, in the circumferential direction of the tire, of the electric power generation element is set so that strain by contraction and strain by expansion that are caused by the rotating tire coming into contact with the ground surface are not simultaneously applied to the single power generation element.

6 Claims, 5 Drawing Sheets

TIRE WITH ELECTRIC POWER GENERATION DEVICE

This application claims the benefit and priority to and is a U.S. National Phase of PCT International Application Number PCT/JP2006/302162, filed on Feb. 8, 2006, designating the United States of America, which claims priority under 35 U.S.C. §119 to Japanese Application Number 2005-034663 filed on Feb. 10, 2005. The disclosures of the above-described applications are hereby incorporated by reference in their entirety.

TECHNICAL FIELD

The present invention relates to a tire with an electric power generation device that converts strain occurring in the tire into electric energy.

BACKGROUND ART

In the case of electric devices such as an acceleration sensor and pressure sensor arranged in a rotating body such as a tire or rim, it is difficult to supply thereto electric power from a power supply arranged in the vehicle or the like because the devices are arranged in a rotating body. Thus, an internal battery is usually used to operate the electrical circuits of these devices; and when the battery is exhausted, the devices don't operate. Accordingly, the battery must be replaced on a regular basis, thus costing much labor for the replacement. Also, when these electric devices are incorporated into a tire, battery replacement cannot be performed.

In order to solve this problem, there have hitherto been known: a technique which arranges in the surface of a tire or in the interior of a tire, a piezoelectric element which generates electricity when deformation is applied thereto, and supplies to electric devices, electricity generated by the piezoelectric element according to strain which the rotating tire suffers from the ground surface or the like; and a technique by which a plurality of electric power generation coils and magnets are arranged on the same circle around the rotation axis of an axle, and when the plurality of electric power generation coils revolve around the axle together with the wheel and thereby traverse the magnetic field of the magnets, electromotive force is generated (for example, refer to Patent Document 1).

Patent Document 1: Japanese Patent Publication 2004-224069

DISCLOSURE OF THE INVENTION

Problems to be Solved by the Invention

However, in general, a piezoelectric element generates electricity at an appropriate efficiency when strain is about 1%, but it is not proper to use it in a tire in which strain of about 5% occurs; thus a sufficient electric power generation amount to be supplied to electric devices may not be obtained.

Also, when electromotive force is generated by electromagnetic induction, an electric power generation ancillary mechanism must be arranged in the interior of a tire or in the vicinity of an axle to supply a sufficient electric power to electric devices. However, a predetermined amount of gas in the interior of a tire is needed to absorb a shock from the road surface, and also a hub, and brake disk or brake drum, or the like are arranged around the axle. Consequently, it is highly likely that the electric power generation ancillary mechanism cannot be made complex or have a large size for the purpose of raising electric power generation performance or improving electric power generation efficiency.

To address the above problems, an object of the present invention is to provide a tire with an electric power generation device for supplying sufficient electric power which has a simple and small-sized construction.

Means for Solving the Problems

To achieve the above object, the present invention proposes a tire comprising an electric power generation device for converting strain occurring in the tire into electric energy, wherein the electric power generation device includes: at least one electric power generation element having at least two stretchable electrodes and elastic polymer, arranged between the electrodes, and producing a potential difference between the electrodes according to strain applied from the tire; and an electrical condenser for accumulating electric energy produced by the electric power generation element, wherein the length, in a circumferential direction of the tire, of the electric power generation element is set so that strain by contraction and strain by expansion that are caused by the rotating tire coming into contact with the ground are not simultaneously applied to the single electric power generation element.

According to the tire having the above construction, the length, in a circumferential direction of the tire, of the electric power generation element is set so that strain by contraction and strain by expansion that are caused by the rotating tire coming into contact with the ground are not simultaneously applied to the single electric power generation element. Consequently, the potential difference produced according to strain by contraction and the potential difference produced according to strain by expansion can be prevented from being simultaneously occurring in the single electric power generation element and cancelling each other, and thus significantly large electric energy can be accumulated, compared to a case where an piezoelectric element is used, or a case where electromotive force by electromagnetic induction is generated.

ADVANTAGES OF THE INVENTION

According to the inventive tire, the potential difference produced according to strain by contraction and the potential difference produced according to strain by expansion can be prevented from simultaneously occurring in the single electric power generation element and cancelling each other, and thus significantly large electric energy can be accumulated, compared to a case where an piezoelectric element is used, or a case where electromotive force by electromagnetic induction is generated. Consequently, a sufficient electric power can be supplied with a simple and small-sized electric power generation device.

The above object and other objects, features and advantages according to the present invention will be evident from the following description and the accompanying drawings.

DESCRIPTION OF SYMBOLS

1 ... tire, 2 ... captread, 3 ... undertread, 4A, 4B ... belt, 5 ... carcass, 6 ... inner liner, 7 ... hub, 10 ... electric power generation element, 10a ... lead, 11 ... electrode, 12 ... dielectric elastomer, 100 ... electric power generation device, 100a ... device body, 110 ... rectifier circuit, 111, 112 ... diode, 113 ... capacitor, 114 ... resistor, 120 ... electrical condenser, 131 ... storage unit, 132 ... CPU, 133 ... power supply control unit, 200 ... external device, f1, f2 ... strain, r1 ... area, s1 ... ground contact face

BEST MODE FOR CARRYING OUT THE INVENTION

The present invention will be described below with reference to the drawings illustrating one embodiment thereof.

Figure 1:
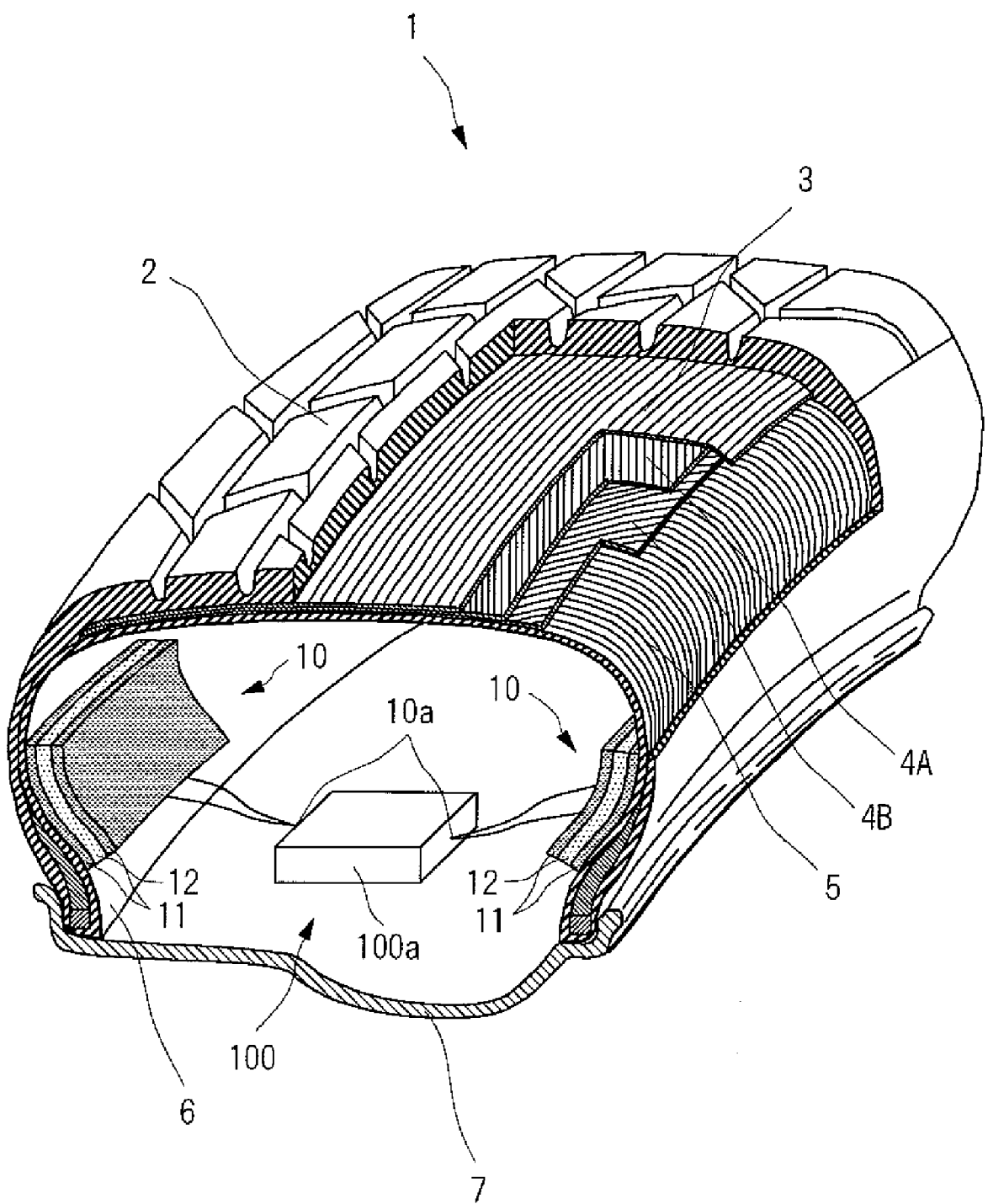
FIG. 1 is a schematic cross-sectional perspective view of a tire with an electric power generation device according to one embodiment of the present invention.
Figure 2:
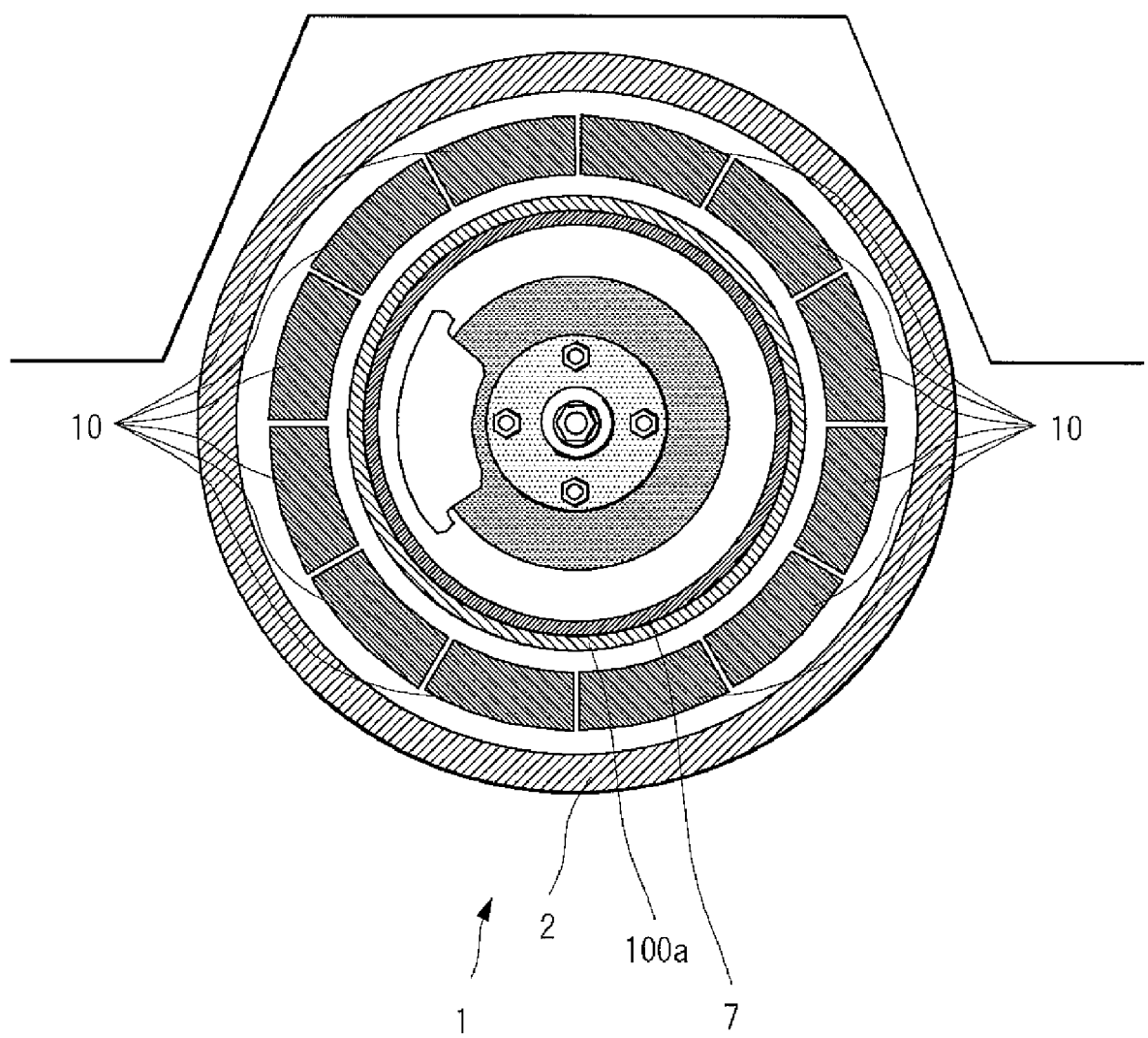
FIG. 2 is a side cross-sectional view of the tire with the electric power generation device according to the one embodiment of the present invention.
Figure 3:
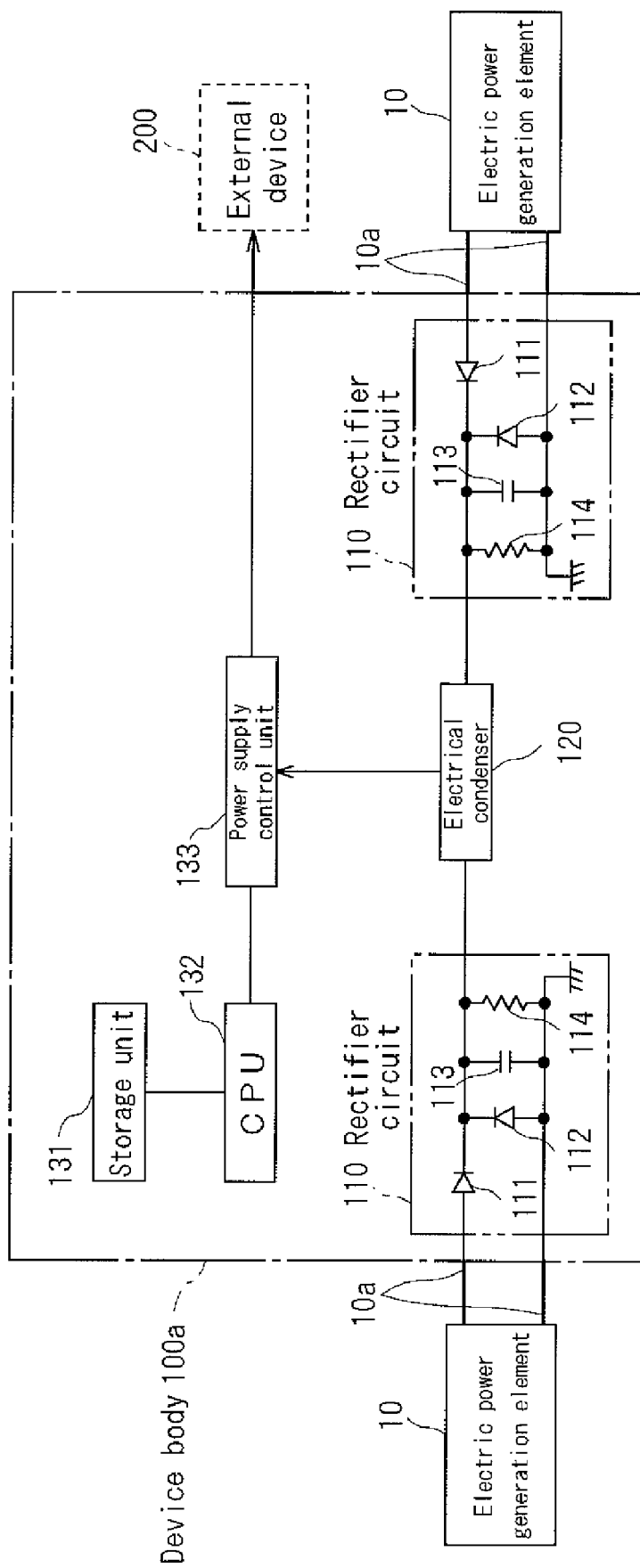
FIG. 3 is an electric block diagram illustrating a configuration of the electric power generation device illustrated in FIG. 1.
Figure 4:
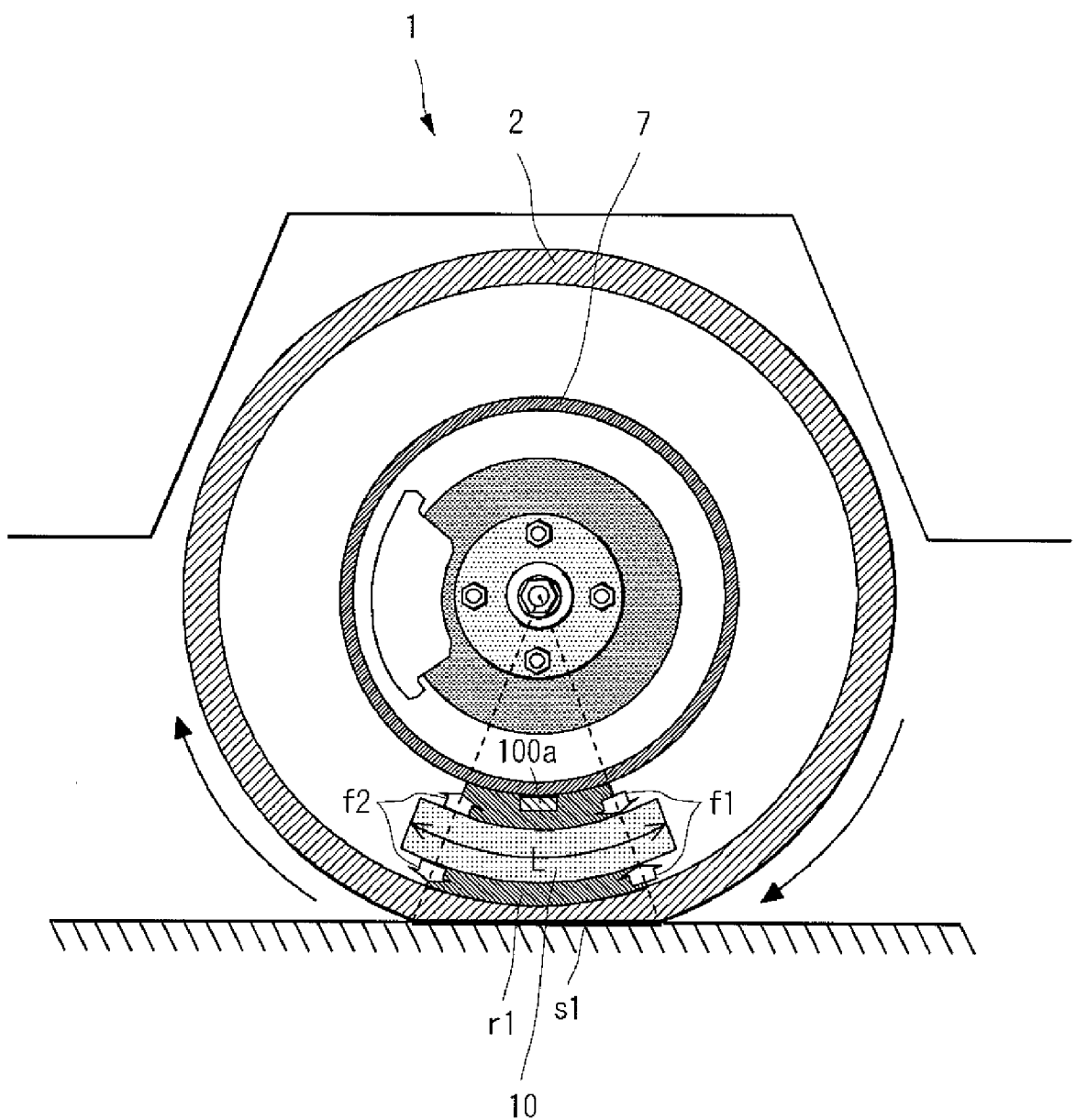
FIG. 4 is a view for explaining the operation of the electric power generation device according to the one embodiment of the present invention.
Figure 5:
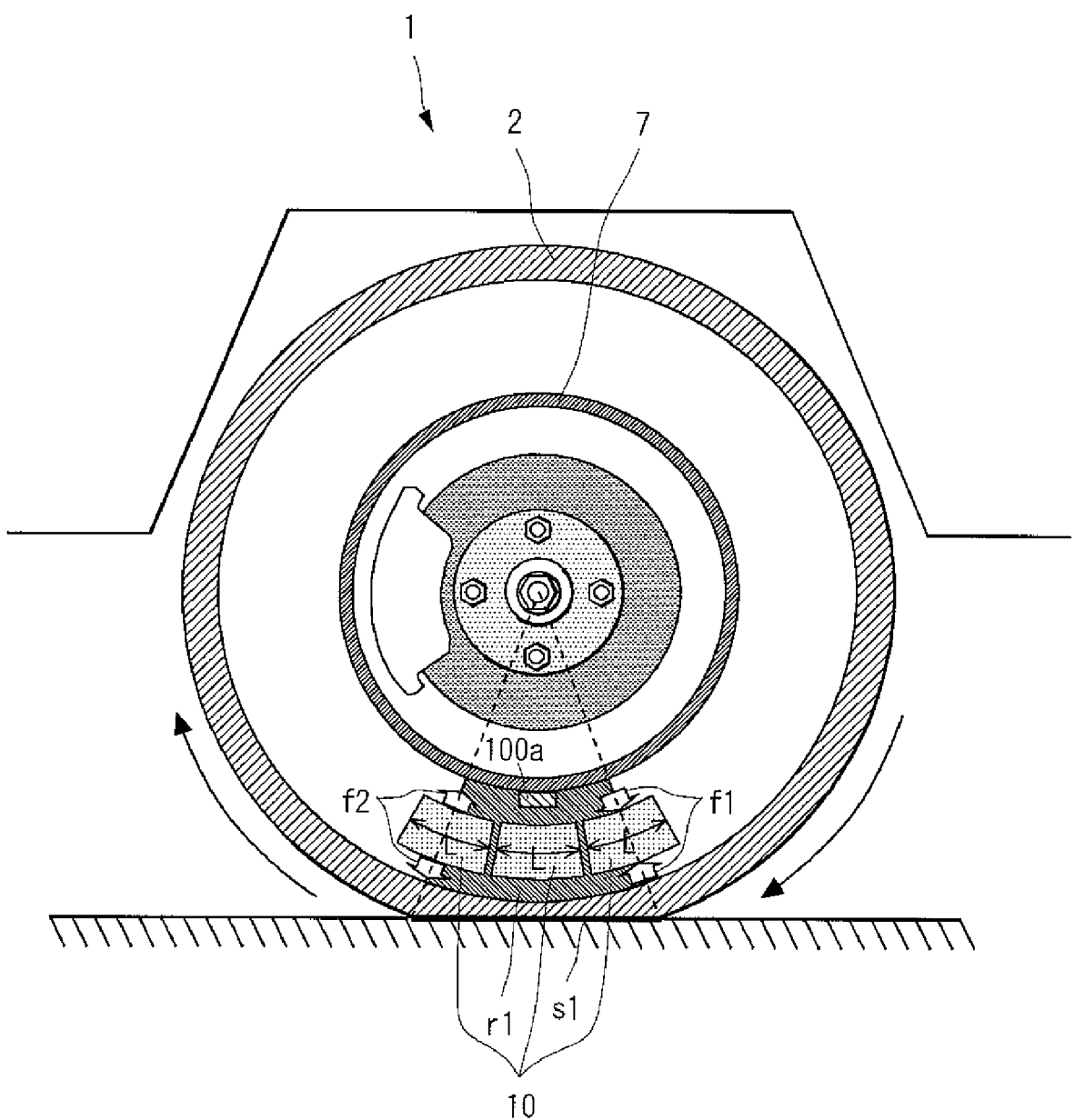
FIG. 5 is a view for explaining the operation of the electric power generation device according to the one embodiment of the present invention.

FIG. 1 is a schematic cross-sectional perspective view of a tire with an electric power generation device according to one embodiment of the present invention; FIG. 2 is a side cross-sectional view of a tire with an electric power generation device according to the one embodiment of the present invention; FIG. 3 is an electric block diagram illustrating a configuration of the electric power generation device illustrated in FIG. 1; FIG. 4 is a view for explaining the operation of the electric power generation device according to the one embodiment of the present invention; and FIG. 5 is a view for explaining the operation of the electric power generation device according to the one embodiment of the present invention.

Referring to FIG. 1, the tire with electric power generation device is constituted of a tire 1 and an electric power generation device 100.

The tire 1 is a known tubeless radial tire, for example, and constituted of a known captread 2, undertread 3, belts 4A and 4B, carcass 5, inner liner 6 and the like, and held in a vehicle or the like by a rim 7 and a wheel (not illustrated).

The electric power generation device 100 is constituted of an electric power generation element 10 and a device body 10a; the electric power generation element 10 is connected via a lead 10a to the device body 100a.

The electric power generation element 10 is constituted of two electrodes 11 and a dielectric elastomer 12 therebetween, and disposed on a side face in the interior of the tire 1.

The electrodes 11 each have a thickness of several μm and are attached to both faces of the dielectric elastomer 12. The material of the electrodes 11 is, for example, conductive polymer, or one obtained by carbon sputtering or carbon evaporation deposition, or the like; any type of material can be used as long as it functions as a stretchable electrode.

The dielectric elastomer 12 functions as insulating derivatives between the two electrodes 11, being elastic polymer producing a potential difference between the electrodes 11 when deformation is applied thereto. As the dielectric elastomer 12, there are elastic polymer containing silicon component, elastic polymer containing acrylic component, and the like; in order to raise permittivity, additives may be contained. The thickness of the dielectric elastomer 12 is in a range from several μm to 1 mm, being set according to required electric energy, placement location or the like. The dielectric elastomer 12 may be preliminarily stretched by use of a frame (not illustrated) or the like for holding the dielectric elastomer 12, or may be stretched in a shape forming-vulcanizing process being a tire manufacturing process.

The electric power generation element 10 having such a configuration is a significantly simple and small-sized element, and functions as a capacitor having excellent stretching properties. Consequently, the electric power generation element 10, being small-sized, can be arranged in the interior of the tire 1. Also, the electric power generation element 10, having excellent stretching properties, can expand and contract sufficiently according to large strain occurring in the tire 1. Thus, since the capacitance of the capacitor varies according to strain applied to the electric power generation element 10, the strain occurring in the tire 1 can be converted into significantly large electric energy, compared to a case where a piezoelectric element is used, or a case where electromotive force by electromagnetic induction is generated.

Referring to FIG. 1, the electric power generation element 10 includes two electrodes, but is not limited thereto; the electric power generation element 10 may have a multilayer structure obtained by arranging dielectric elastomer 12 between two or more electrodes 11.

Also, in order to be subjected to larger strain, the electric power generation element 10 is preferably arranged on a side face in the interior of a tire 1 where strain of about 10% occurs, but is not limited thereto; the electric power generation element 10 may alternatively be buried in the interior of a tire 1, or attached to the surface of the captread 2, or arranged in the bottom face in the interior of a tire 1. The device body 100a is preferably arranged in a rim 7 or the like where strain does not occur, but not limited thereto.

Also, as illustrated in FIG. 2, a plurality of the electric power generation elements 10 may be arranged on a circle around the rotation axis of the axle of the tire 1 on one or both side faces in the interior of the tire 1. As a result, while the tire 1 rotates, strain can be applied to the electric power generation element 10 at all times. In this case, as illustrated in FIG. 2, the device body 10a is also preferably on a circle around the rotation axis of the rim 7 or the like, but not limited thereto.

The configuration of the device body 100a illustrated in FIG. 1 will now be described.

The device body 100a is for accumulating via the lead 10a, electric energy produced in the electric power generation element 10 by a potential difference between the electrodes 11.

Referring to the block diagram of the electric power generation device 100 illustrated in FIG. 3, a rectifier circuit 110 is constituted of diodes 111 and 112, a capacitor 113 and a resistor 114, and constitutes a known full-wave rectifying circuit. The input side of the rectifier circuit 110 is connected via the lead 10a to the electric power generation element 10; the output side of the rectifier circuit 110 is connected to an electrical condenser 120.

The electrical condenser 120 is constituted of, for example, a secondary battery or a large-capacitance capacitor, and the rectifier circuits 110 are connected thereto in parallel. When there are two or more electric power generation elements 10, the device body 100a has the same number of rectifier circuits 110 as the electric power generation element 10, and the rectifier circuits 110 are connected to the electrical condenser 120 in parallel. As a result, even when there occurs no strain in the tire 1, electric power can be supplied using electric energy accumulated in the electrical condenser 120.

The storage unit 131 is constituted of an electrically rewritable nonvolatile semiconductor memory such as EEPROM (electrically erasable programmable read-only memory), and has stored therein information such as supply voltage of an external device 200.

The CPU 132 is constituted of a known microcomputer and the like, and reads the information stored in the storage unit 131 and sends a control signal for supplying the electric energy accumulated in the electrical condenser 120 to the external device 200.

The power supply control unit 133 is constituted of, for example, an electrical switch, boost type power supply circuit and the like, and turns on/off the electrical switch based on a control signal from the CPU 132 and thereby converts the electric energy accumulated in the electrical condenser 120 into a voltage required for the circuit operation of the external device 200. The resultant voltage is supplied to the external device 200 included in the tire 1, such as a pressure sensor, acceleration sensor, transponder and the like. Consequently, the external device 200 included in the tire 1 can receive operationally sufficient electric power from the electric power generation device 100. As the method of supplying electric power to the external device 200, any technique, cabled or wireless, can be used; an antenna or the like for supplying electric power by wireless may be added in the device body 100a, if necessary.

The operation of the electric power generation device 100 in the rotating tire 1 will now be described.

Generally, when the rotating tire 1 makes contacts with the ground surface, it receives force from the ground contact face and thus strain by contraction occurs in the tire 1. Also, when the tire 1 distances itself from the ground surface and is released from the force received from the ground surface, strain by expansion occurs in the tire 1.

Referring to the side cross-sectional view of the rotating tire 1 illustrated in FIG. 4, the electric power generation element 10 is arranged on the side face in the interior of the tire 1, and the device body 100a on the rim 7. On the side face in the interior of the tire 1, there occurs strain f1 by contraction at a ground contact start end of an area r1 which is surrounded by the rotation axis of the tire 1 and a ground contact face s1, and there occurs strain f2 by expansion at a ground contact termination end of the area r1.

In a case where one electric power generation element 10 cannot fit within the area r1, when the tire 1 comes into contact with the ground surface, strain f1 by contraction and strain f2 by expansion are simultaneously applied to the one electric power generation element 10. In this case, the potential difference produced according to strain f1 by contraction and the potential difference produced according to strain f2 by expansion are in an opposite direction to each other, so these potential differences cancel each other and thus the electric power generation element 10 cannot efficiently convert the strain caused by the tire 1 coming into contact with the ground surface into electric energy.

Generally, the area of the ground contact face s1 is determined according to the rotation speed of tire 1, the air pressure within tire 1, the oblateness of tire 1, and the like.

Consequently, as illustrated in FIG. 5, when the electric power generation element 10 having a length L in a circumferential direction set based on these values is arranged on the side face in the interior of the tire 1, the electric power generation element 10 can fit within the area r1 and thus only one of strain f1 by contraction produced at the ground contact start end of the area r1 and strain f2 by expansion produced at the ground contact termination end of the area r1 is applied to the electric power generation element 10; thus the electric power generation element 10 can efficiently convert the strain caused by the tire 1 coming into contact with the ground surface into electric energy.

In this way, according to the tire 1 with the electric power generation device 100 of the above configuration and operation, a length L in a tire circumferential direction of the electric power generation element 10 is set so that the strain by contraction and strain by expansion caused by the rotating tire 1 coming into contact with the ground surface are not simultaneously applied to the single electric power generation element 10, and thus the potential difference produced according to strain f1 by contraction and the potential difference produced according to strain f2 by expansion can be prevented from simultaneously occurring in the single electric power generation element 10 and cancelling each other. Accordingly, significantly large electric energy can be accumulated, compared to a case where a piezoelectric element is used, or a case where electromotive force by electromagnetic induction is generated; thus sufficient electric power can be supplied by use of the simple and small-sized electric power generation device 100.

Also, when the electric energy accumulated in the electrical condenser 120 is supplied to the external device 200 included in the tire 1, the external device 200 can receive operationally sufficient electric power from the electric power generation device 100 and can thus operate semipermanently, requiring no power supply.

Also, when a plurality of the electric power generation elements 10 are arranged on a circle around the rotation axis on at least one side face in the interior of the tire 1, strain can be applied to the electric power generation element 10 at all times during rotation of the tire 1; thus the electric power generation element 10 can efficiently convert the strain occurring in the tire 1 into electric energy.

It should be noted that the above described embodiment is merely exemplary of the present invention, and the configuration of the invention is not limited thereto. Many modifications to the embodiment described above are possible without departing from the gist of the invention.

INDUSTRIAL APPLICABILITY

According to the tire with the electric power generation device for converting strain occurring in the tire into electric energy, the simple and small-sized electric power generation device can supply sufficient electric power to the external device included in the tire. Thus the tire can be used in a vehicle provided in wheels thereof with electric devices such as pressure sensor, acceleration sensor, transponder and the like.

The invention claimed is:

1. A tire comprising an electric power generation device for converting strain occurring in the tire into electric energy,
    wherein the electric power generation device includes: at least one electric power generation element having at least two stretchable electrodes and elastic polymer, arranged between the electrodes, and producing a potential difference between the electrodes according to strain applied from the tire; and an electrical condenser for accumulating electric energy produced by the electric power generation element, and
    wherein the length, in a circumferential direction of the tire, of the electric power generation element is set so that strain by contraction and strain by expansion that are cause by the rotating tire coming into contact with the ground surface are not simultaneously applied to the single electric power generation element.

2. The tire according to claim 1, wherein the electric power generation device supplies the electric energy accumulated in the electrical condenser to another device included in the tire.

3. The tire according to claim 1, wherein a plurality of the electric power generation elements are arranged on a circle around the rotation axis of the tire on at least one side face in the interior of the tire.

4. The tire according to claim 1, wherein the electrical condenser is constituted of a secondary battery.

5. The tire according to claim 1, wherein the electrical condenser is constituted of a large-capacitance capacitor.

6. The tire according to claim 1, wherein the electrodes are each composed of conductive polymer.

* * * * *